United States Patent
Hao et al.

(10) Patent No.: US 11,204,995 B2
(45) Date of Patent: Dec. 21, 2021

(54) CACHE LINE CLEANUP FOR PREVENTION OF SIDE CHANNEL ATTACK

(71) Applicant: International Business Machines Corporation, Armonk, NY (US)

(72) Inventors: Qing Feng Hao, Beijing (CN); Jia Wu, Beijing (CN); Dong Jia Shi, Beijing (CN); Jing EF Zhang, Beijing (CN); Yi Min YM Zhao, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 272 days.

(21) Appl. No.: 16/559,935

(22) Filed: Sep. 4, 2019

(65) Prior Publication Data
US 2021/0064744 A1    Mar. 4, 2021

(51) Int. Cl.
*H04L 29/06* (2006.01)
*G06F 21/55* (2013.01)
*G06F 12/14* (2006.01)

(52) U.S. Cl.
CPC ........ *G06F 21/554* (2013.01); *G06F 12/1458* (2013.01); *G06F 2212/1052* (2013.01); *G06F 2221/034* (2013.01)

(58) Field of Classification Search
CPC ............... G06F 21/554; G06F 12/1458; G06F 2212/1052; G06F 2221/034; G06F 21/556
See application file for complete search history.

(56) References Cited

U.S. PATENT DOCUMENTS

| | | | |
|---|---|---|---|
| 6,249,614 B1* | 6/2001 | Kolesnik | H04N 19/63 375/240.11 |
| 9,229,722 B2* | 1/2016 | Busaba | G06F 9/3851 |
| 9,396,135 B2 | 7/2016 | Kavi | |
| 9,697,356 B2 | 7/2017 | Margalit | |
| 2003/0014602 A1* | 1/2003 | Shibayama | G06F 12/0815 711/156 |
| 2009/0089564 A1 | 4/2009 | Brickell et al. | |
| 2010/0332578 A1 | 12/2010 | Gopal et al. | |
| 2011/0219208 A1* | 9/2011 | Asaad | G06F 9/06 712/12 |

(Continued)

OTHER PUBLICATIONS

"Partitioned Cache Architecture as a Side-Channel Defence Mechanism," https://eprint.iacr.org/2005/280.pdf.

(Continued)

*Primary Examiner* — Taghi T Arani
*Assistant Examiner* — Lin Chang
(74) *Attorney, Agent, or Firm* — Cantor Colburn LLP; Teddi Maranzano

(57) ABSTRACT

Examples of techniques for cache line cleanup for prevention of side channel attack are described herein. An aspect includes determining, by a rollback control unit, a start of a speculative execution in a computer processor. Another aspect includes setting a field in a speculative buffer of the computer processor based on a load or a store to a cache line of a cache being performed by the speculative execution. Another aspect includes determining a failure of the speculative execution. Another aspect includes, based on the failure of the speculative execution, traversing the speculative buffer to determine the set field and performing a cleanup of the cache line based on the set field in the speculative buffer.

17 Claims, 6 Drawing Sheets

(56) References Cited

U.S. PATENT DOCUMENTS

| | | | | |
|---|---|---|---|---|
| 2012/0303934 A1* | 11/2012 | Kaplan | ............... | G06F 9/30043 |
| | | | | 712/205 |
| 2016/0034401 A1* | 2/2016 | Serebrin | ............. | G06F 12/0875 |
| | | | | 711/125 |
| 2017/0262181 A1* | 9/2017 | Bradbury | ................ | G06F 9/466 |
| 2018/0260227 A1* | 9/2018 | Williams | ............ | G06F 11/3442 |
| 2019/0114422 A1* | 4/2019 | Johnson | ................ | G06F 21/566 |

OTHER PUBLICATIONS

John Leyden et al., "Kernel-Memory-Leaking Intel Processor Design Flaw Forces Linux, Windows Redesign." https://www.theregister.co.uk/2018/01/02/intel_cpu_design_flaw/,2005.

Vladimir Kiriansky et al., "DAWG:A Defense Against Cache Timing Attacks in Speculative Execution Processors" https://eprint.iacr.org/2018/418.pdf, 2018.

* cited by examiner

SPECULATIVE BUFFER 600

| INDEX | BIT0 | BIT1 | BIT2 | BIT3 | BIT4 | BIT5 | BIT6 | BIT7 |
|-------|------|------|------|------|------|------|------|------|
| 0     |      | 1    |      |      |      |      |      |      |
| 1     |      |      |      | 1    |      |      |      |      |
| 2     |      |      |      |      |      |      | 1    |      |
| ...   |      |      |      |      |      |      |      |      |
| N     |      |      |      |      |      |      |      | 1    |

FIG. 6

CACHE LINE CLEANUP FOR PREVENTION OF SIDE CHANNEL ATTACK

BACKGROUND

The present techniques relate to processors. More specifically, the techniques relate to the prevention of side channel attacks in processors.

A side channel attack, such as Meltdown or Spectre, is an attack based on information that may be accessed from the physical implementation of a computer system. For example, a side channel attack may steal kernel and/or process data from the physical memory of a computer processor. Meltdown exploits a flaw in a processor's out-of-order execution to fetch kernel and physical memory data, while Spectre exploits characteristics of speculative execution to fetch process data, as well as some kernel data. Any type of operating system (OS) may be targeted by a side channel attack.

In order to protect against a side channel attack, a computer system may isolate the kernel page table from the user page table, using a technique referred to as page table isolation (PTI). However, if there are a lot of input/output (I/O) operations involving the page table entries (PTEs) during operation of the processor, there may be a significant slowing of the performance of the computer system. Restricting or blocking of speculative execution may also be implemented to prevent a side channel attack, but this may cause a significant downgrade in the performance of the processor.

SUMMARY

According to an embodiment described herein, a computer processor includes a cache, a speculative buffer, and a rollback control unit. The rollback control unit may be configured to determine a start of a speculative execution in the computer processor. The rollback control unit may be further configured to set a field in the speculative buffer based on a load or a store to a cache line of the cache being performed by the speculative execution. The rollback control unit may be further configured to determine a failure of the speculative execution. The rollback control unit may be further configured to, based on the failure of the speculative execution, traverse the speculative buffer to determine the set field and perform a cleanup of the cache line based on the set field in the speculative buffer.

According to another embodiment described herein, a method can include determining, by a rollback control unit, a start of a speculative execution in a computer processor. The method can also include setting a field in a speculative buffer of the computer processor based on a load or a store to a cache line of a cache being performed by the speculative execution. The method can also include determining a failure of the speculative execution. The method can also include, based on the failure of the speculative execution, traversing the speculative buffer to determine the set field and performing a cleanup of the cache line based on the set field in the speculative buffer.

According to another embodiment described herein, an apparatus can be configured to determine a start of a speculative execution in a computer processor. The apparatus can be further configured to set a field in a speculative buffer of the computer processor based on a load or a store to a cache line of a cache being performed by the speculative execution. The apparatus may be further configured to determine a failure of the speculative execution. The apparatus may be further configured to, based on the failure of the speculative execution: traverse the speculative buffer to determine the set field, and perform a cleanup of the cache line based on the set field in the speculative buffer.

BRIEF DESCRIPTION OF THE DRAWINGS

FIG. 6 is a block diagram of an example speculative buffer for cache line cleanup for prevention of side channel attack.

DETAILED DESCRIPTION

Figure 1:
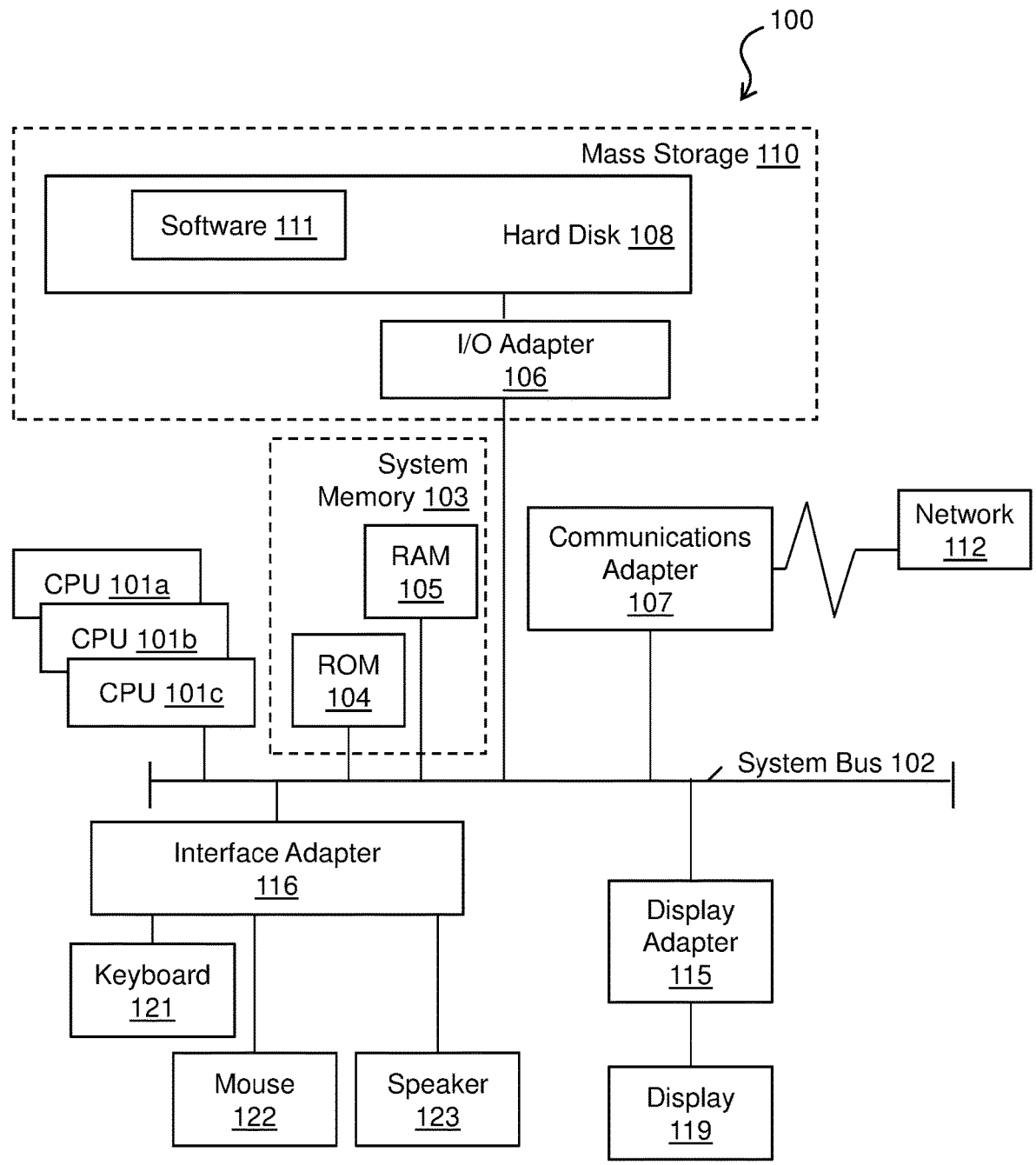
FIG. 1 is a block diagram of an example computer system that may include cache line cleanup for prevention of side channel attack.

Cache line cleanup may be implemented in a processor in order to prevent side channel attacks. The cleanup of the cache lines that were touched by a failed speculative execution prevents side channel attacks with a relatively low performance impact. The handling of speculative execution in the processor is unchanged. Only data that is associated with a failed speculative execution is cleaned up in the cache, so that other data in the cache is unaffected.

Out-of-order execution is a technique that enables relatively high utilization of the execution units of a processor core. Instead of processing the instructions strictly in the sequential program order given by the software that is being executed, the processor executes instructions as soon as the required resources are available. A processor may decode instructions to microoperations in the backend, and the microoperations are piped and scheduled to execute in parallel in execution units of the processor. For out-of-order execution, a reorder buffer is provided in the processor to buffer completed microoperations, update the architectural state in order, and manage the ordering of exceptions for out-of-order execution.

Speculative execution is an out-of-order execution technique used by high-speed processors to increase performance by guessing a likely future execution path and prematurely executing the instructions in the likely execution path. For example, when a software program's control flow depends on an uncached data value located in the main memory of the computer system, several hundred clock cycles may be required to fetch the value from the main memory. Rather than wasting the clock cycles by idling, the processor may guess the direction of control flow, save a checkpoint of its register state, and proceed to speculatively execute the program on the guessed path. When the value eventually arrives from the physical memory the processor checks the correctness of the initial guess. If the guess was wrong, the speculative execution fails, and the processor discards the incorrect speculative execution by reverting the register state back to the stored checkpoint, resulting in performance comparable to idling. If the guess was correct, the speculatively executed results are committed, yielding a significant performance gain, as useful work was accomplished during the delay caused by the fetching.

Embodiments of cache line cleanup for prevention of side channel attack include a speculative protection control unit (SPCU) including a speculative buffer that tracks the cache lines that are modified by speculative execution, and a rollback control unit. The SPCU may be implemented in the microarchitectural state per core, which is transparent to the OS and applications, such that no changes to software are needed. The SPCU operates in parallel with regular execution. When a speculative execution fails, the data in the cache lines that are indicated by the speculative buffer is cleaned up, e.g., invalidated or flushed. In some embodiments, the speculative buffer may be a fixed-size array (e.g., 512 bytes) that is used to record the status of each cache line of the level 1 (L1) data cache in the processor. In some embodiments, the speculative buffer may be an array in which the index corresponds to a cache line number, and a value of 1 of a bit in an entry corresponding to an index indicates that data is cached for a speculative execution at the cache line corresponding to the index, while a value of 0 indicates that no data is cached at the index by any current speculative execution. In some embodiments, each bit in the speculative buffer entry represents an associated cache line's status for a particular nested speculative execution, e.g. a byte of the speculative buffer may represent 8 nested speculative executions.

In some embodiments, the rollback control unit may read speculative microoperations from the reorder buffer, parse the operand addresses, and mark the fields associated with the operand addresses in the speculative buffer. In some embodiments, when speculative execution fails, the rollback control unit may flush or invalidate cache lines that are marked in the speculative buffer.

Embodiments of the SPCU may further include various control fields, which may be located in a control register or a program status word (PSW). The control fields may include an SPCU enable field and a Speculative Buffer Not Empty field (SBN), which may each be a single bit in some embodiments. The control fields may further include a nested Speculative Execution Level (SEL), which in some embodiments may be a 4-bit counter. The rollback control unit uses these control fields in conjunction with the speculative buffer to clean up the cache lines that hold data associated with a speculative execution.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101a, 101b, 101c, etc. (collectively or generically referred to as processor(s) 101). The processors 101, also referred to as processing circuits, are coupled via a system bus 102 to a system memory 103 and various other components. The system memory 103 can include a read-only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein with reference to FIGS. 2-5. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

It is to be understood that the block diagram of FIG. 1 is not intended to indicate that the computer system 100 is to include all of the components shown in FIG. 1. Rather, the computer system 100 can include any fewer, or any appropriate additional components, that are not illustrated in FIG. 1.

Figure 2:
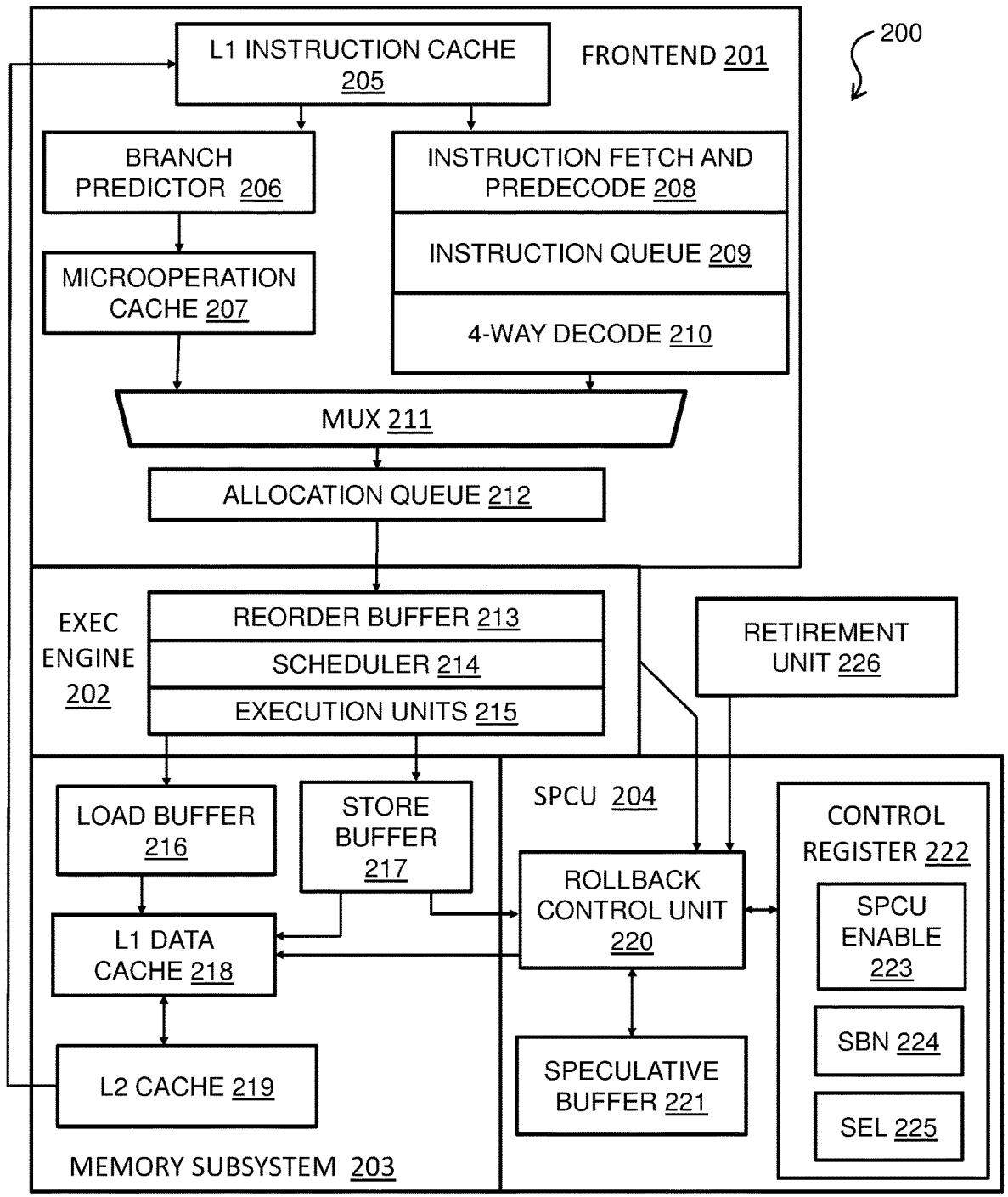
FIG. 2 is a block diagram of an example processor including cache line cleanup for prevention of side channel attack.

FIG. 2 is a block diagram of an embodiment of processor 200 including cache line cleanup for prevention of side channel attack. Processor 200 may correspond to any of CPUs 101a-c of FIG. 1. Processor 200 includes a front end 201, an execution engine 202, a memory subsystem 203, and a speculative protection control unit (SPCU) 204. Processor 200 further includes a retirement unit 226. The retirement unit 226 retires operations corresponding to a failed speculative execution in the processor 200.

Front end 201 includes level 1 (L1) instruction cache 205, branch predictor 206, microoperation cache 207, instruction fetch and predecode 208, instruction queue 209, 4-way decode 210, multiplexer (MUX) 211, and allocation queue 212. In front end 201, instructions from computer software that is being executed by the computer system in which processor 200 is located are decoded and queued, and branch prediction for speculative execution is performed by branch predictor 206. Instructions are placed in the allocation queue 212 for execution by the execution engine 202.

Execution engine 202 includes a reorder buffer 213, a scheduler 214, and execution units 215. The reorder buffer 213 buffers completed microoperations, updates the architectural state in order and manages the ordering of exceptions for out-of-order execution. The scheduler assigns microoperations to a plurality of execution units 215 for execution. Memory subsystem 203 includes a load buffer 216, a store buffer 217, L1 data cache 218, and level 2 (L2) cache 219. The execution units 215 load data from and store data in the L1 data cache 218 via load buffer 216 and store buffer 217. Most recently used data is stored in the L1 data cache 218; as the L1 data cache 218 fills up, less recently used data is written out to the L2 cache.

SPCU 204 includes a rollback control unit 220, speculative buffer 221, and control register 222. The rollback control unit 220 receives notifications regarding the start and resolution (i.e., success or failure) of speculative executions in the processor 200 execution engine 202 from execution engine 202, and uses the speculative buffer 221 and the various fields in control register 222 to perform cache line cleanup for prevention of side channel attack. In some embodiments, the scheduler 214 may send a notification to the rollback control unit 220 when a checkpoint is saved at the start of a new speculative execution. In some embodiments, the rollback control unit 220 parses operand addresses from the reorder buffer 213 in order to determine whether a load or store to the L1 data cache 218 is being performed. In some embodiments, speculative buffer 221 is an array that holds indicators for which cache lines in L1 data cache 218 currently hold data corresponding to a speculative execution. The control register 222 includes an SPCU enable field 223, a speculative buffer not empty field (SBN) 224, and a speculative execution level counter (SEL) 225. In some embodiments, control register 222 may be a PSW register. In some embodiments, the SPCU enable field 223 is a single bit that may be set by, for example, an administrator of the computer system in which processor 200 is located in order to turn the SPCU 204 on or off. In some embodiments, SBN 224 is a single bit that indicates whether any cache lines in the L1 data cache 218 are currently storing data for a speculative execution. In some embodiments, SEL 225 is a multiple bit counter (e.g., 4 bits) that tracks the current speculative execution level for nested speculative execution. In some embodiments, the SPCU 204 runs on the execution engine 202 of the processor 200.

It is to be understood that the block diagram of FIG. 2 is not intended to indicate that the processor 200 is to include all of the components shown in FIG. 2. Rather, the processor 200 can include any fewer, or any appropriate additional components, that are not illustrated in FIG. 2.

Figure 3:
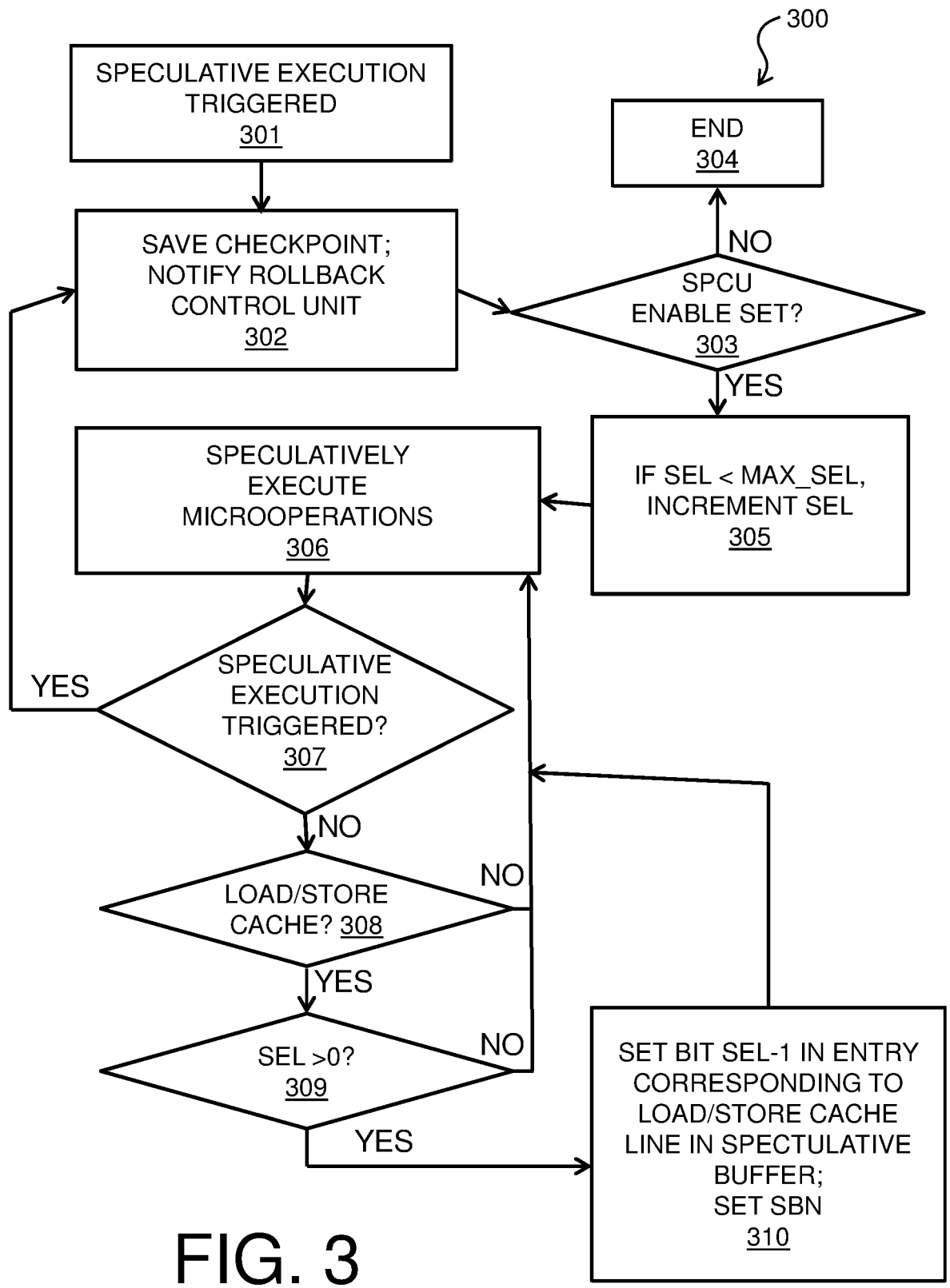
FIG. 3 is a process flow diagram of an example method for cache line cleanup for prevention of side channel attack.

FIG. 3 is a process flow diagram of an example method 300 for cache line cleanup for prevention of side channel attack. The method 300 can be implemented with any suitable computing device, such as the computer system 100 of FIG. 1, or using the processor 200 of FIG. 2. For example, the methods described below can be implemented in the SPCU 204 of FIG. 2.

At block 301, speculative execution is triggered in the processor 200. For example, the control flow of computer software that is being executed by the processor 200 may depend on a value that is stored in the hard disk 108 of the computer system 100. During the time required to retrieve the value from the hard disk 108, the processor 200 may guess a likely execution path for the software program and proceed with execution of the software along the guessed execution path.

In block 302, data corresponding to a checkpoint is saved for the speculative execution in retirement unit 226. The checkpoint that is saved in block 302 allows the processor 200 to roll back the speculative execution if the speculative execution fails. The checkpoint may include the current values stored in any registers in the processor 200. A notification that the checkpoint corresponding to the speculative execution was saved is sent from the execution engine 202 to the rollback control unit 220 in SPCU 204.

In block 303, it is determined whether the SPCU enable field 223 is set. The SPCU enable field 223 may be a single bit that may be set or unset by, for example, an administrator of the computer system in some embodiments. If it is determined in block 303 that the SPCU enable field 223 is not set, the SPCU 204 is not enabled, flow proceeds to block 304, and method 300 ends. If it is determined in block 303 that the SPCU enable field 223 is set, flow proceeds from block 303 to block 305.

In block 305, if SEL 225 is less than a maximum speculative execution level value (MAX_SEL), SEL 225 is incremented. SEL 225 gives a current speculative execution level for nested speculative execution in the computer processor. MAX_SEL may be any appropriate predetermined number in various embodiments. MAX_SEL may be equal to a number of bits in an entry of the speculative buffer 221 in some embodiments.

In block 306, speculative execution of microoperations in the guessed execution path proceeds. In block 307, it is determined, for each operation that is speculatively executed, whether another speculative execution is triggered by the operation. If speculative execution is not triggered in block 307, it is determined whether the operation is a load or store to the L1 data cache 218. If it is determined in block 308 that the operation is not a load or store to the L1 data cache 218, flow proceeds from block 308 back to block 306, and speculative execution proceeds. The determinations of blocks 307 and 308 are performed for each operation that is speculatively executed.

If it was determined in block 307 that speculative execution was triggered by an operation, flow proceeds from block 307 back to block 302. A checkpoint for the speculative execution that was triggered in block 307 is saved in block 302, rollback control unit 220 is notified, and flow proceeds to block 303. If it is determined that the SPCU enable field 223 is set in block 303, flow proceeds to block 305. In block 305, if SEL 225 is less than MAX_SEL, then SEL 225 is incremented to reflect the current nested speculative execution level, and flow proceeds back to block 306.

If it was determined in block 308 that the operation is a load or store to the L1 cache 218, flow proceeds from block 308 to block 309. In block 309, it is determined whether SEL 225 is greater than zero. If it is determined in block 309 that SEL 225 is not greater than zero, then flow proceeds from block 309 back to block 306. If it is determined in block 309 that SEL 225 is greater than zero, flow proceeds from block 309 to block 310. In block 310, a bit corresponding to the value of SEL 225 minus 1 in an entry having an index corresponding to the cache line of the load or store is set in the speculative buffer 221. For example, if the value of SEL is 3, then, in block 309, the second bit in the entry corresponding to the cache line is set in the speculative buffer 221. SBN 224 is also set in block 310 to indicate that there are cache lines in the L1 data cache 218 that hold data corresponding to a speculative execution.

Figure 4:
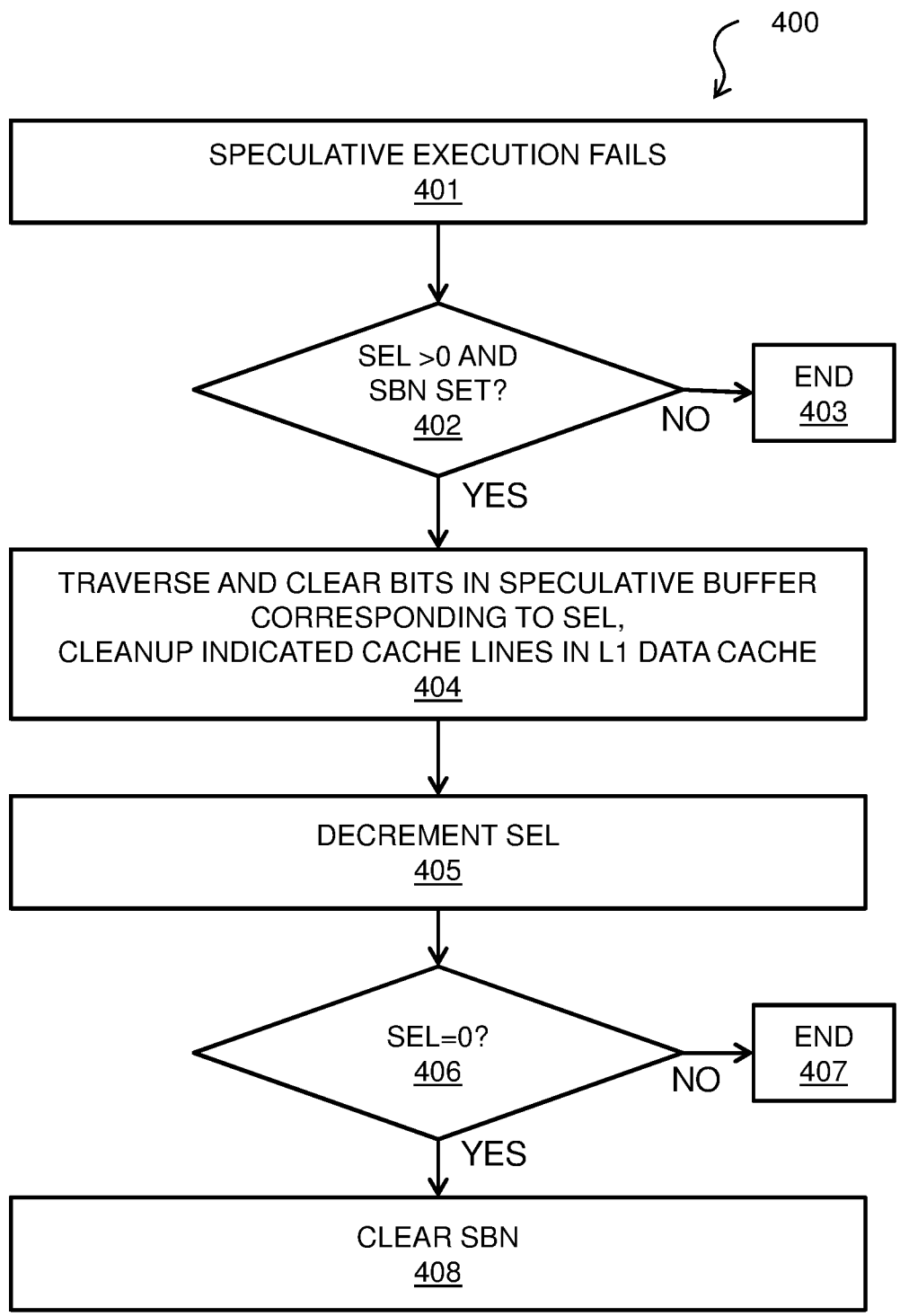
FIG. 4 is process flow diagram of another example method for cache line cleanup for prevention of side channel attack.

FIG. 4 is a process flow diagram of another example method for cache line cleanup for prevention of side channel attack. The method 400 can be implemented with any suitable computing device, such as the computer system 100 of FIG. 1, or the processor 200 of FIG. 2. For example, the methods described below can be implemented in the SPCU 204 of FIG. 2.

At block 401, a speculative execution that is being performed in the processor 200 fails. For example, in block 401, the data value that was being retrieved from the hard disk 108 arrives at processor 200, and it is determined based on the retrieved data value that the guessed path that was being speculatively executed was incorrect, and the speculatively executed instruction are rolled back. In some embodiments, the SPCU 204 may receive a notification from the execution engine 202 of the failure of the speculative execution. In block 402, it is determined whether SEL 225 is greater than zero and whether the SBN 224 is set. If it is determined that either the SEL 225 is equal to zero, or the SBN 224 is not set, flow proceeds from block 402 to block 403, and method 400 ends because there is no data in the L1 data cache 218 corresponding to the speculative execution, and cache line cleanup is not needed for the failed speculative execution.

If it is determined in block 402 that the SEL 225 is greater than zero and the SBN 224 is set, flow proceeds to block 404. In block 404, the speculative buffer 221 is traversed, and cache lines in the L1 data cache 218 that are indicated by entries corresponding to SEL 225 in the speculative buffer 221 are cleaned up by the rollback control unit 220. The cache line cleanup of block 404 may include invalidating the data in any indicated cache lines in the L1 data cache 218, or flushing any indicated cache lines in the L1 data cache 218, in various embodiments. In some embodiments, the cleanup comprises invalidating the data in the L1 data cache 218 corresponding to each bit that is set in the speculative buffer 221, and writing back valid data to the L2 cache 219. The entries in the speculative buffer 221 are cleared (e.g., set to zero) as their corresponding cache lines in the L1 data cache 218 are cleaned up. For example, if, in block 404, the value of SEL 225 is three, then any cache line in the L1 data cache 218 is cleaned up if its corresponding entry in the speculative buffer 221 has bit two set.

From block 404, flow proceeds to block 405, in which SEL 225 is decremented. Then, in block 406, it is determined whether the decremented SEL 225 is equal to zero. If it is determined in block 406 that SEL 225 is not equal to zero, flow proceeds to block 407, and method 400 ends. If it is determined in block 406 that SEL 225 is equal to zero, then there is no current speculative execution in the processor 200, so the SBN 224 is cleared in block 408.

Figure 5:
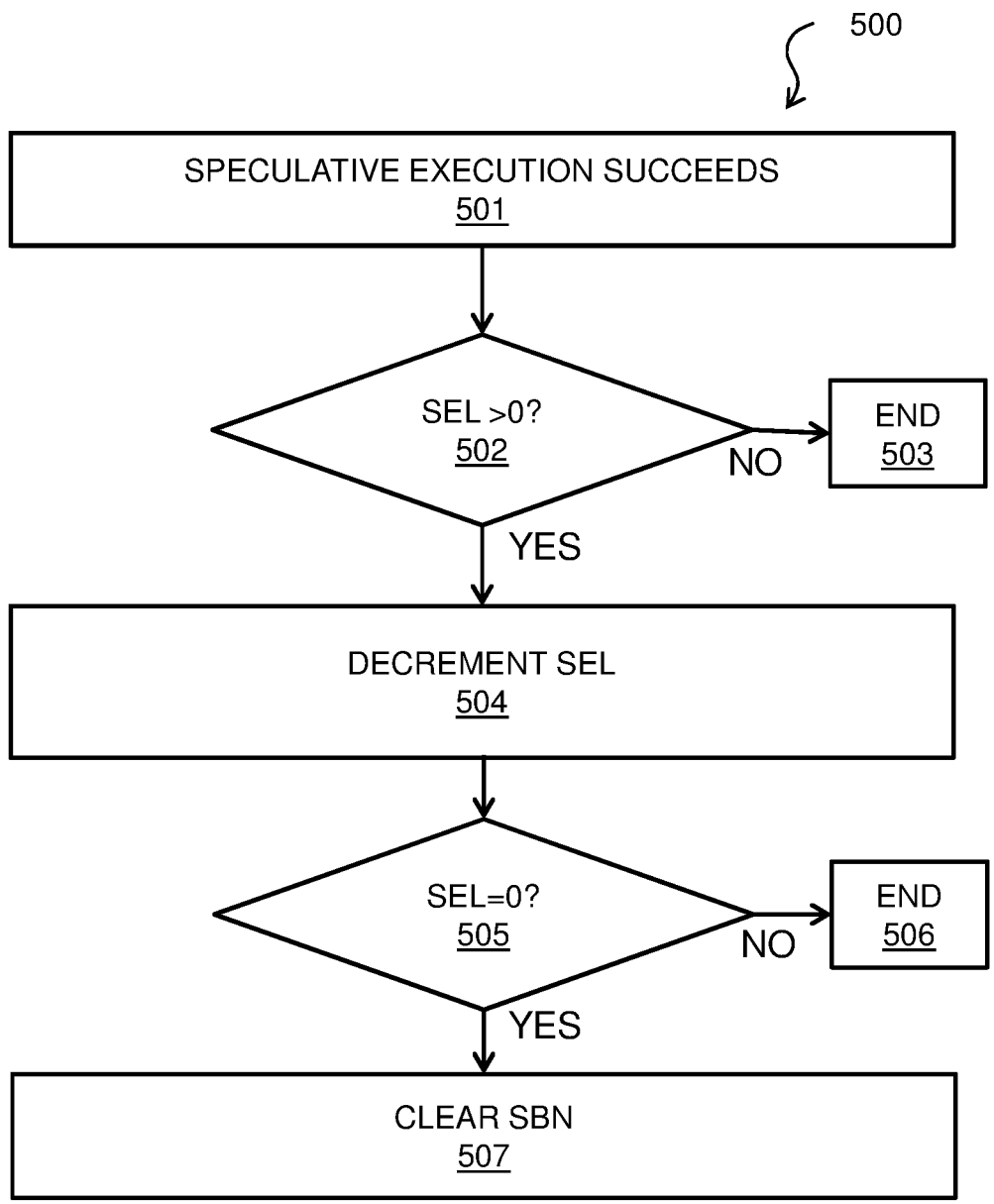
FIG. 5 is process flow diagram of another example method for cache line cleanup for prevention of side channel attack.

FIG. 5 is a process flow diagram of another example method for cache line cleanup for prevention of side channel attack. The method 500 can be implemented with any suitable computing device, such as the computer system 100 of FIG. 1, or the processor 200 of FIG. 2. For example, the methods described below can be implemented in the SPCU 204 of FIG. 2.

At block 501, a speculative execution that is being performed in the processor 200 succeeds. For example, in block 501, the data value that was being retrieved from the hard disk 108 arrives at processor 200, and it is determined based on the retrieved data value that the guessed path that was being speculatively executed was correct, so that the results of the speculatively executed instructions may be committed. In some embodiments, the SPCU 204 may receive a notification from the execution engine 202 of the success of the speculative execution.

In block 502, it is determined whether SEL 225 is greater than zero. If it is determined that the SEL 225 is not greater than zero, flow proceeds from block 502 to block 503, and method 500 ends. If it is determined in block 502 that the SEL 225 is greater than zero, flow proceeds to block 504. In block 504, SEL 225 is decremented. Then, in block 505, it is determined whether the decremented SEL 225 is equal to zero. If it is determined in block 505 that SEL 225 is not equal to zero, flow proceeds to block 506, and method 500 ends. If it is determined in block 505 that SEL 225 is equal to zero, then there is no current speculative execution in the processor 200, so the SBN 224 is cleared in block 507, and method 500 ends.

Method 300 of FIG. 3, method 400 of FIG. 4, and method 500 of FIG. 5 are executed in parallel in the SPCU 204 during operation of the processor 200. Method 300 of FIG. 3 is triggered whenever a first level speculative execution is started, method 400 of FIG. 4 is triggered whenever a speculative execution at any level fails, and method 500 of FIG. 5 is triggered whenever a speculative execution at any level succeeds.

FIG. 6 is a block diagram of an embodiment of a speculative buffer 600. Speculative buffer 600 may correspond to speculative buffer 221 of FIG. 2. As shown in FIG. 6, speculative buffer 600 is a fixed size array that includes a plurality of entries, each identified by a respective index 1 to N. The number N of entries in the speculative buffer 600 corresponds to the number of cache lines in the L1 data cache 218. Each entry includes a plurality of bits, each bit corresponding to a speculative execution level. In the example speculative buffer 600 each entry is a byte; however, this is for illustrative purposes only, the entries in a speculative buffer may be any appropriate size. MAX_SEL, which is used in the determination of block 305 of FIG. 3, is equal to the number of bits in each entry of the speculative buffer 221. Therefore, for the example embodiment of a speculative buffer 600 that is shown in FIG. 6, MAX_SEL is equal to 8. The speculative buffer tracks what data in the L1 cache 218 has been modified by speculative execution, so that if the speculative execution fails, the data may be reverted to the pre-speculative execution state. For the example speculative buffer 600 shown in FIG. 6, cache line 0 holds data corresponding to a second level speculative execution; cache line 1 holds data corresponding to a third level speculative execution, cache line 2 holds data corresponding to a sixth level speculative execution, and cache line N holds data corresponding to an eighth level speculative execution. When a speculative execution fails, any bits corresponding to that speculative execution are cleared as the cache line corresponding to the index is cleaned up. For example, if an eighth level speculative execution fails, then cache line N in cleaned up in the L1 data cache 218, and bit 7 in index N in the speculative buffer 600 is cleared (e.g., set equal to zero).

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer processor comprising: a cache; a speculative buffer; and a rollback controller, the rollback controller configured to:
    determine a start of a speculative execution in the computer processor;
    set a field in the speculative buffer based on a load or a store to a cache line of the cache being performed by the speculative execution;
    determine a failure of the speculative execution; and
    based on the failure of the speculative execution:
        traverse the speculative buffer to determine the set field; and
        perform a cleanup of the cache line based on the set field in the speculative buffer,
        wherein the speculative buffer comprises an array having a number of entries equal to a number of cache lines in the cache, wherein each entry in the speculative buffer comprises a number of bits equal to a maximum speculative execution level of the computer processor.

2. The computer processor of claim 1, wherein the cache comprises a level 1 (L1) data cache, and wherein the cleanup comprises:
    invalidating data in the cache line of the L1 cache that is indicated by the set field in the speculative buffer;
    writing the valid data back to a level 2 (L2) cache; and
    clearing the field in the speculative buffer.

3. The computer processor of claim 1, further comprising a speculative execution level counter, the rollback control unit further configured to:
    increment the speculative execution level counter based on determining the start of the speculative execution; and
    decrement the speculative execution level counter based on determining the failure of the speculative execution level counter;
    wherein the cleanup is performed based on the speculative execution level counter being greater than zero.

4. The computer processor of claim 3, wherein the set field in the speculative buffer comprises a number of bits in an entry of the speculative buffer that corresponds to an index of the cache line, each bit corresponding to a value of the speculative execution level counter.

5. The computer processor of claim 3, further comprising a speculative buffer not empty field (SBN), wherein the rollback control unit is further configured to:
    set the SBN based on the set field in the speculative buffer; and
    clear the SBN based on the speculative execution level counter being equal to zero;
    wherein the cleanup is performed based on the SBN being set.

6. The computer processor of claim 1, wherein the start of the speculative execution is determined based on a notification of saving of a checkpoint from a scheduler of the computer processor.

7. A computer-implemented method, comprising:
    determining, by a rollback control unit, a start of a speculative execution in a computer processor;
    setting a field in a speculative buffer of the computer processor based on a load or a store to a cache line of a cache being performed by the speculative execution;
    determining a failure of the speculative execution; and
    based on the failure of the speculative execution:
        traversing the speculative buffer to determine the set field; and
            performing a cleanup of the cache line based on the set field in the speculative buffer,
        wherein the speculative buffer comprises an array having a number of entries equal to a number of cache lines in the cache, wherein each entry in the speculative buffer comprises a number of bits equal to a maximum speculative execution level of the computer processor.

8. The computer-implemented method of claim 7, wherein the cache comprises a level 1 (L1) data cache, and wherein the cleanup comprises:
    invalidating data in the cache line of the L1 cache that is indicated by the set field in the speculative buffer;
    writing the invalidated data back to a level 2 (L2) cache; and
    clearing the field in the speculative buffer.

9. The computer-implemented method of claim 7, comprising:
    increment a speculative execution level counter based on determining the start of the speculative execution; and
    decrement the speculative execution level counter based on determining the failure of the speculative execution level counter;
    wherein the cleanup is performed based on the speculative execution level counter being greater than zero.

10. The computer-implemented method of claim 9, wherein the set field in the speculative buffer comprises a bit in an entry of the speculative buffer that corresponds to an index of the cache line, the bit corresponding to a value of the speculative execution level counter.

11. The computer-implemented method of claim 9, comprising:
    set a speculative buffer not empty field (SBN) based on setting the field in the speculative buffer; and
    clear the SBN based on the speculative execution level counter being equal to zero;
    wherein the cleanup is performed based on the SBN being set.

12. The computer-implemented method of claim 7, wherein the start of the speculative execution is determined based on a notification of saving of a checkpoint from a scheduler of the computer processor.

13. An hardware processing device, configured to:
    determine a start of a speculative execution in a computer processor;

set a field in a speculative buffer of the computer processor based on a load or a store to a cache line of a cache being performed by the speculative execution;
determine a failure of the speculative execution; and
based on the failure of the speculative execution:
   traverse the speculative buffer to determine the set field; and
     perform a cleanup of the cache line based on the set field in the speculative buffer,
wherein the speculative buffer comprises an array having a number of entries equal to a number of cache lines in the cache, wherein each entry in the speculative buffer comprises a number of bits equal to a maximum speculative execution level of the computer processor.

14. The hardware processing device of claim 13, wherein the cache comprises a level 1 (L1) data cache, and wherein the cleanup comprises:
   invalidating data in the cache line of the L1 cache that is indicated by the set field in the speculative buffer;
   writing the invalidated data back to a level 2 (L2) cache; and
   clearing the field in the speculative buffer.

15. The hardware processing device of claim 13, the apparatus further configured to:
   increment a speculative execution level counter based on determining the start of the speculative execution; and
   decrement the speculative execution level counter based on determining the failure of the speculative execution level counter;
wherein the cleanup is performed based on the speculative execution level counter being greater than zero.

16. The hardware processing device of claim 15, wherein the set field in the speculative buffer comprises a bit in an entry of the speculative buffer that corresponds to an index of the cache line, the bit corresponding to a value of the speculative execution level counter.

17. The hardware processing device of claim 15, the apparatus further configured to:
   set a speculative buffer not empty field (SBN) based on setting the field in the speculative buffer; and
   clear the SBN based on the speculative execution level counter being equal to zero;
wherein the cleanup is performed based on the SBN being set.

* * * * *